March 18, 1930.   N. A. CHRISTENSEN   1,750,875
BRAKE MECHANISM
Filed March 22, 1924
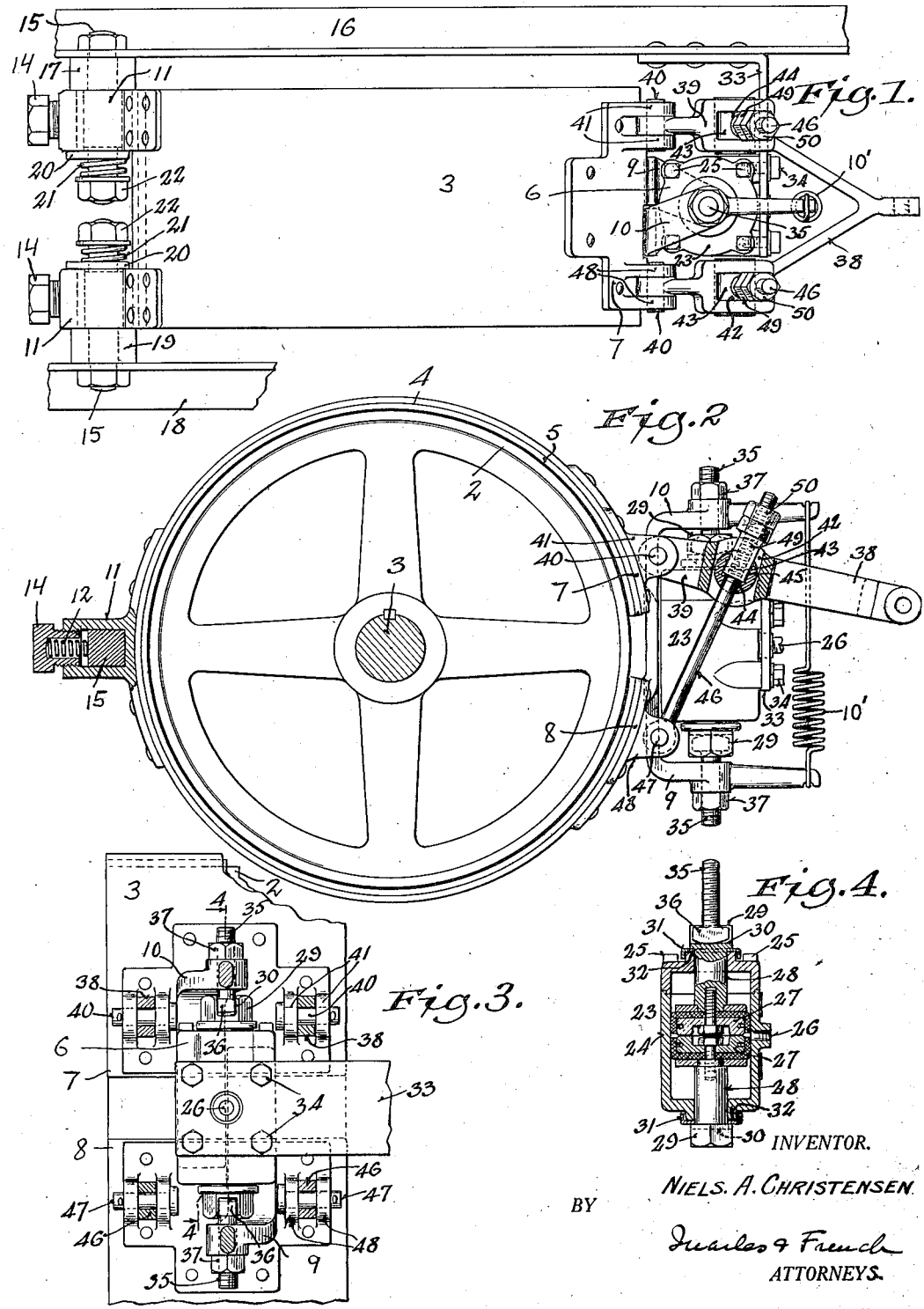
INVENTOR.
NIELS. A. CHRISTENSEN.
BY
Juailes & French
ATTORNEYS.

Patented Mar. 18, 1930

1,750,875

UNITED STATES PATENT OFFICE

NIELS A. CHRISTENSEN, OF MILWAUKEE, WISCONSIN

BRAKE MECHANISM

Application filed March 22, 1924. Serial No. 701,061.

The invention relates to brake mechanism for automotive vehicles, and more particularly to transmission brake mechanism for the cardan or drive-shaft thereof.

One object of the invention is to provide a transmission brake operated by a fluid-pressure-operated motor.

A further object of the invention is to provide a transmission brake operated by a fluid-pressure-operated motor and also operable manually without interference from the power-operating means.

The invention further consists in the several features hereinafter set forth and more particularly defined by claims at the conclusion hereof.

In the drawings: Fig. 1 is a plan view of a brake mechanism embodying the invention;

Fig. 2 is an elevation view of the brake mechanism, parts being broken away and parts being shown in section;

Fig. 3 is a detail end view of the brake mechanism, parts being shown in section;

Fig. 4 is a detail sectional view of the fluid-pressure-operated motor taken on the line 4—4 of Fig. 3.

In the drawings the numeral 2 designates a brake-drum mounted on the drive-shaft 3 of an automobile vehicle, 4 a brake, here shown as a band-brake having suitable brake-lining 5 and lugs 7 and 8 secured to the band adjacent its ends.

The lug 7 has an arm 9 formed integral therewith or secured thereto extending down adjacent the opposite end of the band and laterally therefrom. The lug 8 has an arm 10 formed integral therewith or secured thereto and extending up adjacent the opposite end of the band and projecting laterally therefrom. A spring 10' is secured at its ends to projecting lugs on the arms 9 and 10 and serves as a part of the brake release means, since it acts to normally move the end portions of the band away from each other. The intermediate portion of the brake-band is provided with spaced yoke members 11. A spring 12 acts between a screw-threaded plug 14 in the end of each yoke and an anchor member 15. Each yoke 11 provides a flat-sided slot in which the squared or flat-sided portion of an anchor member 15 is slidably mounted, as shown in Fig. 2, so that the yoke cannot turn but is restricted to a straight line movement in a radial direction, said springs 12 thereby acting to move said yokes and the brake-band connected therewith bodily away from its brake-drum 2. The anchor member 15 is in each instance secured to some non-rotatable part of the vehicle, which may be a part specially provided for the purpose or an existing part of the vehicle construction. In the drawings one of the anchor members is bolted at one end to a transverse frame member 16 of the vehicle and has a spacing member or nut 17 mounted thereon between said frame-member and the adjacent yoke, while the other anchor member is bolted at one end to a transverse frame-member 18 and has a spacing member or nut 19 mounted thereon between said frame-member and the adjacent yoke. In each instance the yokes are yieldingly held against the spacing member by a plate 20 held against the yoke by a spring 21 mounted between said plate and a nut 22 on the threaded outer end of the anchor member 15, which construction prevents lateral movement of the band relative to the anchor member and the brake-drum. Thus, the springs 12 and the spring 10' normally hold the band released from the drum.

The power means for setting the brake comprises a fluid-pressure-operated motor 23 which is shown in detail in Fig. 4. This motor comprises a two-part brake cylinder 24 whose parts are secured together by bolts 25 and which has a central air port 26 for the inlet and exhaust of the pressure fluid, a pair of opposed suitably packed pistons 27 working in said cylinder and having piston rods 28 bolted or otherwise suitably secured to the heads of said pistons and projecting from the ends of said cylinder. Each piston rod has a polygonal head 29 exterior of the brake-cylinder provided with a slot 30. The head 29 of the piston rod is preferably larger in diameter than the main part of the rod and has a flanged washer 31 abutting against it, and each piston is limited in its inward movement by engagement of the inner end of the head or washer with a shoulder 32 formed by the adjacent end of the cylinder. The brake-cylinder 24 is secured to a bracket 33 carried by the frame-member 16 by bolts 34. Each piston rod is directly and adjustably connected with the brake by means of an adjustable jack-screw 35 which has its head milled flat to form a T-shaped member or tongue 36 fitting into the slot 30 of the head 29. As the head 29 of the piston rod is hexagonal it may be engaged by a wrench or other suitable tool so that the screw 35 may be screwed up into the lug or other anchorage provided for it on the brake and secured in adjusted position by a suitable locknut. As shown, the adjusting screw 35 has threaded connection with the arm 9 while the other has a similar connection with the arm 10, and when said screws are adjusted they are held in adjusted position by a locknut 37.

With this construction when motive fluid under pressure is introduced between the two pistons 27, said pistons are moved outwardly thereby moving the arms 9 and 10 apart and thereby drawing up on the ends of the band associated with said arms to produce an application of the brake to the drum and at the same time storing up brake release energy in the springs 10' and 12. When the fluid pressure is released the springs 10 and 12 release the band from braking contact with the drum.

Should the fluid-pressure-operated means become inoperative for any reason, mechanism is provided for direct mechanical operation of the brake. This mechanism includes an operating lever 38 adapted to be moved manually by the operator; that is, by foot or hand, and having a forked end whose bifurcations 39 are pivotally connected by pins 40 to ears 41 on the lug 7. Each bifurcation also has a slotted portion 42 in which a trunnion 43 is mounted for free oscillation in said lever and provided with a bore 44 and a counterbore 45. A rod in the form of an eyebolt 46, pivotally connected at its eyed end by a pin 47 to ears 48 on the lug 8, has its threaded end slidably mounted in the bores 44 and 45 of each trunnion 43 and has an adjustable sleeve-nut 49 mounted thereon and slidable in the counterbore 45 and secured in adjusted position by a locknut 50.

When the fluid-pressure motor is operated these rods 46 will slide up in the trunnions 43 and upon release of the air-brake these rods will slide down into the socket provided in the trunnion without riding on the threads of the rod as the cylindrical portion of the sleeve-nut 49 is of sufficient diameter to provide clearance between the rod and the sides of the bore 44, and as the travel of the rod is such as to prevent the sleeve-nut projecting outside of the socket provided for it by the counterbore 45. Thus, the operation of the air-brake is not interfered with by the lever 38 and its connections with the band.

When, however, the lever 38, which is adapted to be manually moved by the operator, either by hand or by foot, is swung upwardly, the ends of the band will be drawn together to apply the brake since such movement puts tension upon the ends of the band through said lever and rods 46, said rods being drawn upwardly by said lever. In case of manual operation, as the fluid pressure is not being applied, the brake-cylinder pistons will remain in their inoperative position and the jack-screws 35 will move up in slots 30 of the piston rods when the brake is manually operated and down into said slots in contact with their inner ends when the lever 38 is swung down and the springs 12 and 10' release the band from the brake.

While I have described this construction more particularly as a brake for the transmission-shaft, it is to be understood that the same is capable of use on the rear wheel and, consequently, when I refer to a "brake-drum" in the appended claims, I mean a brake-drum attached either to the rear wheel or to the drive-shaft operatively connected to the rear axle.

No mechanism has been shown for controlling the passage of compressed air to and from the brake-cylinder, as such mechanism is distinct subject matter from the brake mechanism itself, though it will be understood that such mechanism includes a valve structure which establishes communication between a supply of compressed air and the brake-cylinder to operate the pistons and then cuts off this supply and connects the brake-cylinder with the atmosphere for release of the brake.

The working medium for the fluid-pressure-operated motor is preferably compressed air because of its ease of control, its adaptability for efficient service throughout all seasons of the year in different climates, and its practical efficiency even where small leakage may occur in the motor, though oil or other liquids may be used as a working medium without departing from my invention.

It will be understood that the manually-operated mechanism for applying the brake may be used in case the fluid-pressure-operated means should for any reason become inoperative, and such manually-operated means may also be employed for certain emergencies, as in holding the vehicle on a hill.

As this application is directed more particularly to the combined manual and fluid-pressure-operated control of the brake the absence of claims herein to the connections between the brake and motor is not to be considered as a waiver of right to claims for such subject-matter as the same has been included in my copending application Serial No. 701,062, filed March 22, 1924.

I desire it to be understood that this invention is not to be limited to any particular form or arrangement of parts except in so far as such limitations are specified in the claims or necessitated by the prior art.

What I claim as my invention is:

1. In brake mechanism of the class described, the combination with a brake-drum, of a brake, fluid-pressure-operated means operatively connected to said brake to apply the same, an operating lever connected to one of the ends of said brake, a member connecting the other end of said brake to said lever and movable lengthwise of itself relative to said lever when said fluid-pressure-operated means is operated, and means to release said brake.

2. In brake mechanism of the class described, the combination with a brake-drum, of a brake, a brake-cylinder, opposed pistons working in said cylinder and operatively connected to the ends of the brake to move said brake into braking engagement with said drum, an operating lever connected to one of the ends of said brake, a member connecting the other end of said brake to said lever and movable lengthwise of itself relative to said lever when said fluid-pressure-operated means is operated, the operative connection between said pistons and the ends of the brake including lost motion connections permitting application of said brake by said lever and said member independently of said pistons, and means to release said brake.

3. In brake mechanism of the class described, the combination with a brake-drum, of a brake, a brake-cylinder, opposed pistons working in said cylinder, adjustable and slidable connections between said pistons and the end portions of said brake to move the brake into engagement with said drum or to permit movement of said end portions independently of said pistons, mechanical means for operating said brake having adjustable connection therewith to move the brake into engagement with said drum or permit independent movement of said end portions by said pistons, and means to release said brake after application either by said pistons or by said mechanical means.

4. In brake mechanism of the class described, the combination with a brake-drum, of a brake, a brake-cylinder, opposed fluid-pressure-operated pistons working in said cylinder and having rods, jack-screws adjustably connected with the ends of said brake and having slidable connection with the rods for said pistons whereby to apply the brake upon the brake-applying movement of said pistons or permit movement of said ends of said brake independently of said pistons, an operating lever connected to one of the ends of the brake, and a member connecting the other end of said brake to said lever to apply the brake, said member having an adjustable lengthwise movement of itself relative to said lever to permit movement of said ends by said pistons independently of said lever, and means to release said brake.

5. In brake mechanism of the class described, the combination with a brake-drum, of a brake, a brake-cylinder, opposed fluid-pressure-operated pistons working in said cylinder and having rods, jack-screws adjustably and directly connected with the ends of said brake and having slidable connection with the rods for said pistons whereby to apply the brake on the brake-applying movement of said pistons or permit movement of said ends of said brake independently of said pistons, other means actuated by the operator for applying said brake independently of said pistons, and means to release said brake.

6. In brake mechanism of the class described, the combination of a brake drum, of a contracting type brake engageable with said drum, a fluid-pressure-operated means acting upon the ends of said brake to move it into braking engagement with said drum, manually operated means independently connected with the ends of said brake to move it into braking engagement with said drum, and means to release said brake.

7. In brake mechanism of the class described, the combination of a brake drum, of a contracting type brake engageable with said drum, a fluid-pressure-operated motor acting directly upon the ends of said brake to move it into braking engagement with said drum, manually-operated means independently connected with the ends of said brake to move it into braking engagement with said drum, and means to release said brake.

In testimony whereof, I affix my signature.

NIELS A. CHRISTENSEN.